United States Patent
Rinne (10) Patent No.: US 8,891,764 B2
(45) Date of Patent: Nov. 18, 2014

(54) QUARANTINE METHOD FOR SELLABLE VIRTUAL GOODS

(75) Inventor: Timo Rinne, Helsinki (FI)

(73) Assignee: P2S Media Group Oy, Helsinki (FI)

( * ) Notice: Subject to any disclaimer, the term of this patent is extended or adjusted under 35 U.S.C. 154(b) by 0 days.

(21) Appl. No.: 13/984,649

(22) PCT Filed: Feb. 8, 2012

(86) PCT No.: PCT/FI2012/050116
§ 371 (c)(1),
(2), (4) Date: Aug. 9, 2013

(87) PCT Pub. No.: WO2012/110696
PCT Pub. Date: Aug. 23, 2012

(65) Prior Publication Data
US 2013/0322623 A1 Dec. 5, 2013

(30) Foreign Application Priority Data
Feb. 15, 2011 (FI) .................................... 20115143

(51) Int. Cl.
*H04L 9/00* (2006.01)
*H04N 21/6332* (2011.01)
(Continued)

(52) U.S. Cl.
CPC .......... *H04L 9/0861* (2013.01); *H04N 21/6332* (2013.01); *G06F 21/10* (2013.01); *H04N 21/41407* (2013.01); *H04N 21/4408* (2013.01); *H04N 21/6582* (2013.01)
USPC .............. 380/44; 713/155; 713/162; 713/168; 713/193; 726/26; 726/27; 726/28; 726/29

(58) Field of Classification Search
CPC .......... H04N 21/6332; H04N 21/4408; H04N 21/6582; G06F 21/10; G04N 21/41407; H04L 9/0861
See application file for complete search history.

(56) References Cited

U.S. PATENT DOCUMENTS 8,595,139 B2 * 11/2013 Maruyama et al. .............. 705/59
2003/0131252 A1 * 7/2003 Barton .......................... 713/193
(Continued)

FOREIGN PATENT DOCUMENTS

EP 1975831 A1 10/2008

OTHER PUBLICATIONS

"Hybrid Cryptosystem", Wikipedia, http://en.wikipedia.ord/w/index.php?title=Hybrid_cryptosystem&oldid=332920825; Oct. 28, 2011.

(Continued)

*Primary Examiner* — Shin-Hon Chen
(74) *Attorney, Agent, or Firm* — Ziegler IP Law Group, LLC.

(57) ABSTRACT

A method is disclosed for quarantining digital content data for a service in a terminal device. In an embodiment, the method includes creating a digital content data item, e.g. a digital still image or a video stream, in the memory of the terminal device, generating a symmetric encryption key for encrypting the created digital content data item, encrypting the digital content data item using the generated symmetric encryption key, encrypting the generated symmetric encryption key using public key of the service, deleting the unencrypted version of the digital content data item and of the symmetric encryption key from the memory of the terminal device, sending the encrypted version of the digital content data item and of the symmetric encryption key to a server of the service, and receiving from the server of the service at least one of the following: instruction to delete the encrypted digital content data item from the memory of the terminal device, and decrypted version of the symmetric encryption key for decrypting the encrypted digital content data item in the memory of the terminal device.

13 Claims, 4 Drawing Sheets

(51) Int. Cl.
   *G06F 21/10*      (2013.01)
   *H04N 21/414*     (2011.01)
   *H04N 21/4408*    (2011.01)
   *H04L 9/08*       (2006.01)
   *H04N 21/658*     (2011.01)
   *G06F 7/04*           (2006.01)
   *G06F 17/30*          (2006.01)
   *H04N 7/16*           (2011.01)
   *H04L 29/06*          (2006.01)
   *H04L 9/32*           (2006.01)

(56) References Cited

U.S. PATENT DOCUMENTS

| | | |
|---|---|---|
| 2005/0021948 A1 | 1/2005 | Kamperman |
| 2007/0005974 A1* | 1/2007 | Kudou ................ 713/171 |
| 2007/0043680 A1 | 2/2007 | Fox et al. |
| 2007/0136821 A1* | 6/2007 | Hershaft et al. ............ 726/27 |
| 2007/0156587 A1* | 7/2007 | Yu et al. ................ 705/50 |
| 2008/0015997 A1* | 1/2008 | Moroney et al. ............ 705/51 |
| 2008/0104706 A1* | 5/2008 | Karp et al. ............ 726/26 |
| 2008/0148414 A1 | 6/2008 | Tom |
| 2009/0052670 A1* | 2/2009 | You et al. ................ 380/277 |
| 2009/0190765 A1 | 7/2009 | Sweazey |
| 2009/0320144 A1* | 12/2009 | Fang et al. ............ 726/29 |
| 2011/0162086 A1* | 6/2011 | Rogel et al. ............ 726/28 |

OTHER PUBLICATIONS

International Search Report and Written Opinion mailed Jul. 19, 2012 in PCT/FI2012/050116.

* cited by examiner

QUARANTINE METHOD FOR SELLABLE VIRTUAL GOODS

TECHNICAL FIELD

The aspects of the present disclosure relate to a method and arrangement for quarantining digital content for secure transfer of the content and rights associated with the content.

BACKGROUND

Mobile terminal devices, e.g. mobile smart phones, have means for producing digital content data items, e.g. digital still images and/or videos and for storing those items on a local memory storage medium of the device. The terminal also has means for sending the content data items to a server over a wireless network connection. Sometimes, the content being transferred in the network must be protected from third party access by some encryption means.

A server accessible through a network, e.g. the Internet, may be adapted to receive digital content from a mobile terminal. The content may be put up for sale by an application service run by the server. The application service may require temporary exclusive rights to the content while it is being sold by the service. If the rights to the content are sold or otherwise transferred permanently away from the creator of the content, the content needs to be removed from the device of the creator of the content. On the other hand, if the sale is unsuccessful, the access rights to the content need to be returned back to the creator of the content as efficiently as possible.

There is a need for solution that efficiently combines temporary or permanent revocation of access rights to data of a device with the secure transfer of the data from the device to a server computer.

SUMMARY

An aspect of the present disclosure is directed to providing methods and arrangements for efficient temporary quarantining of digital content in a terminal device and secure transfer of the quarantined digital content to a server computer.

The first aspect of the present disclosure is a method for quarantining digital content data for a service in a terminal device. The method is characterized in that it comprises any, any combination or all of:

creating a digital content data item, e.g. a digital still image or a video stream, in the memory of the terminal device, generating a symmetric encryption key for encrypting the created digital content data item, encrypting the digital content data item using the generated symmetric encryption key, encrypting the generated symmetric encryption key using public key of the service, deleting the unencrypted version of the digital content data item and of the symmetric encryption key from the memory of the terminal device, sending the encrypted version of the digital content data item and of the symmetric encryption key to a server of the service, and receiving from the server of the service at least one of the following:

instruction to delete the encrypted digital content data item from the memory of the terminal device, and decrypted version of the symmetric encryption key for decrypting the encrypted digital content data item in the memory of the terminal device.

The second aspect of the present disclosure is a method for managing in a server computer of a service quarantined digital content data produced in a terminal device. The method is characterized in that it comprises any, any combination or all of:

receiving an encrypted digital content data item from a terminal device, receiving an encrypted symmetric encryption key from the terminal device, decrypting the symmetric encryption key using the private key of the service, decrypting the digital content data item using the decrypted symmetric encryption key, and sending to the terminal device at least one of the following:

instruction to delete the encrypted digital content from the memory of the terminal device, and decrypted version of the symmetric encryption key for decrypting the encrypted digital content data item in the memory of the terminal device.

The algorithms for generating and using the symmetric encryption key may be algorithms of any suitable symmetric key solution known to a person in the art, for example a Twofish, Serpent, AES, Blowfish, CAST5, RC4, 3DES or IDEA.

The public and private keys may be keys of any suitable public key cryptography solution, for example RSA, DSS, ElGamal, Paillier cryptosystem and various elliptic curve techniques.

The third aspect of the present disclosure is a mobile terminal device, e.g. a mobile phone, which comprises a processor and memory and is communicatively connectable to a server computer over a wireless data communication network. The device may comprise any or any combination or all of the following means for:

creating a digital content data item, e.g. a digital still image or a video stream, in the memory of the terminal device, generating a symmetric encryption key for encrypting the created digital content data item, encrypting the digital content data item using the generated symmetric encryption key, encrypting the generated symmetric encryption key using public key of the service, deleting the unencrypted version of the digital content data item and of the symmetric encryption key from the memory of the terminal device, sending the encrypted version of the digital content data item and of the symmetric encryption key to a server of the service, and receiving from the server of the service at least one of the following:

instruction to delete the encrypted digital content data item from the memory of the terminal device, and decrypted version of the symmetric encryption key for decrypting the encrypted digital content data item in the memory of the terminal device.

The fourth aspect of the present disclosure is a server computer which comprises a processor and memory and is communicatively connectable to a terminal device over a data communication network. The server may comprise any or any combination or all of the following means for:

receiving an encrypted digital content data item from a terminal device, receiving an encrypted symmetric encryption key from the terminal device, decrypting the symmetric encryption key using the private key of the service, decrypting the digital content data item using the decrypted symmetric encryption key, and sending to the terminal device at least one of the following:

instruction to delete the encrypted digital content from the memory of the terminal device, and decrypted version of the symmetric encryption key for decrypting the encrypted digital content data item in the memory of the terminal device.

The fifth aspect of the present disclosure is an arrangement comprising the mobile terminal device of the third aspect of the present disclosure communicatively connected to a server computer of the fourth aspect of the present disclosure.

The sixth aspect of the invention is a computer program product executable in a mobile terminal device. The computer program product may comprise any or any combination of the following instructions for:

creating a digital content data item, e.g. a digital still image or a video stream, in the memory of the terminal device, generating a symmetric encryption key for encrypting the created digital content data item, encrypting the digital content data item using the generated symmetric encryption key, encrypting the generated symmetric encryption key using public key of the service, deleting the unencrypted version of the digital content data item and of the symmetric encryption key from the memory of the terminal device, sending the encrypted version of the digital content data item and of the symmetric encryption key to a server of the service, and receiving from the server of the service at least one of the following:

instruction to delete the encrypted digital content data item from the memory of the terminal device, and decrypted version of the symmetric encryption key for decrypting the encrypted digital content data item in the memory of the terminal device The seventh aspect of the present disclosure is a computer program product executable in a server computer. The computer program product may comprise any or any combination of the following instructions for:

receiving an encrypted digital content data item from a terminal device, receiving an encrypted symmetric encryption key from the terminal device, decrypting the symmetric encryption key using the private key of the service, decrypting the digital content data item using the decrypted symmetric encryption key, and sending to the terminal device at least one of the following:

instruction to delete the encrypted digital content from the memory of the terminal device, and decrypted version of the symmetric encryption key for decrypting the encrypted digital content data item in the memory of the terminal device.

Some embodiments of the present disclosure are described herein, and further applications and adaptations of the present disclosure will be apparent to those of ordinary skill in the art.

BRIEF DESCRIPTION OF DRAWINGS

In the following, the aspects of the present disclosure are described in greater detail with reference to the accompanying drawings in which.

DETAILED DESCRIPTION OF THE DRAWINGS

Figure 1:
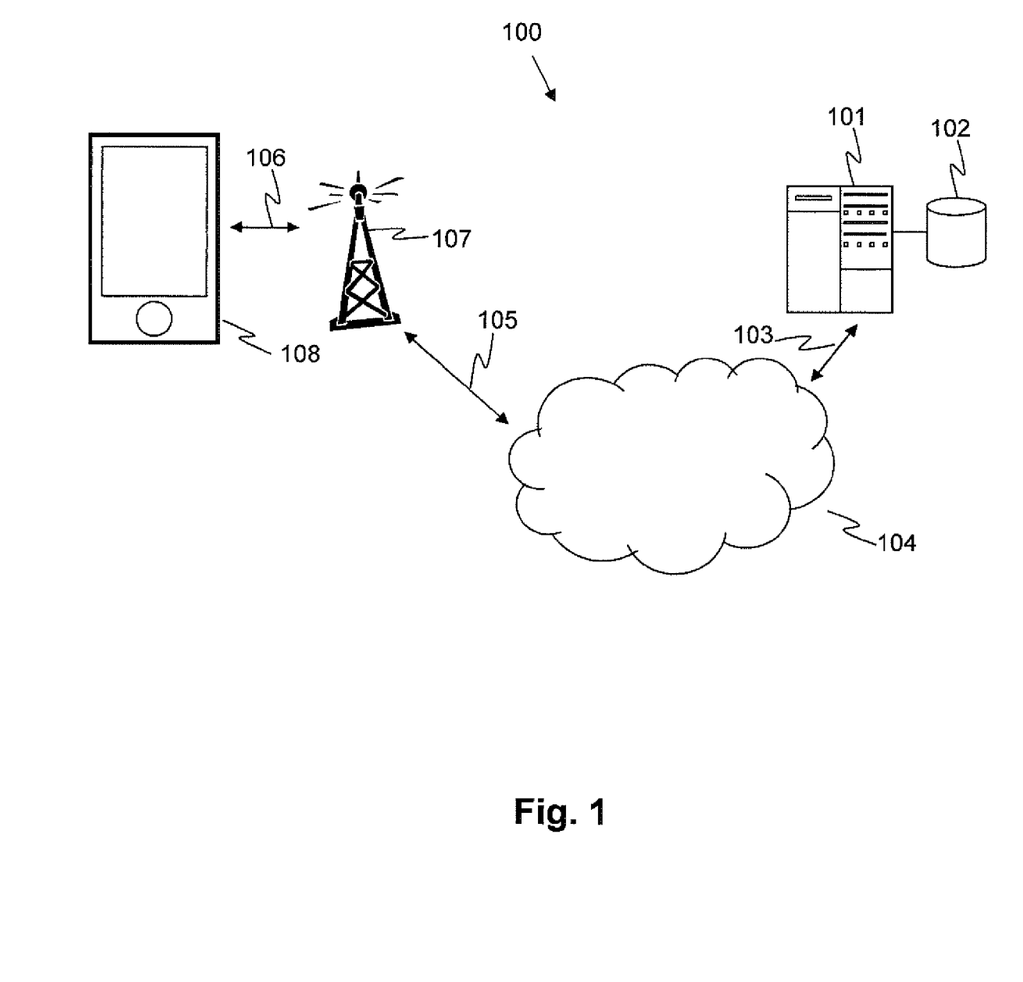
FIG. 1 shows an exemplary arrangement according to an embodiment of the present disclosure.

FIG. 1 depicts an exemplary arrangement 100 according to an embodiment of the present disclosure. The arrangement has at least one server 101 having a persistent data storage 102. The server is communicatively connected 103 to a data communication network 104, e.g. the Internet. The server 101 provides services accessible via the network. Those services may comprise e.g. storage services for content created by users of the service, encryption and decryption services for encrypting an decrypting content and keys received from a terminal device 108, matching services for establishing a link between a user producing content and a user willing to purchase content, payment services for executing a payment transaction between two users of the system and software download service for providing software to mobile terminals of the system. The services may be provided by one server or they may be provided, e.g. for scalability and/or availability reasons, by a plurality of servers.

The arrangement further comprises at least one mobile terminal 108, e.g. a mobile phone, preferably a smart phone comprising a camera and some suitable messaging application, e.g. SMS, MMS and/or e-mail. Additionally, the phone has access to the data communication network 104 e.g. via a radio communication connection 106 over a base station 107 which is connected 105 to the data communication network. The mobile terminal 108 comprises means for downloading computer executable software to the storage device of the terminal and for installing the downloaded software in the terminal device.

Figure 2A:
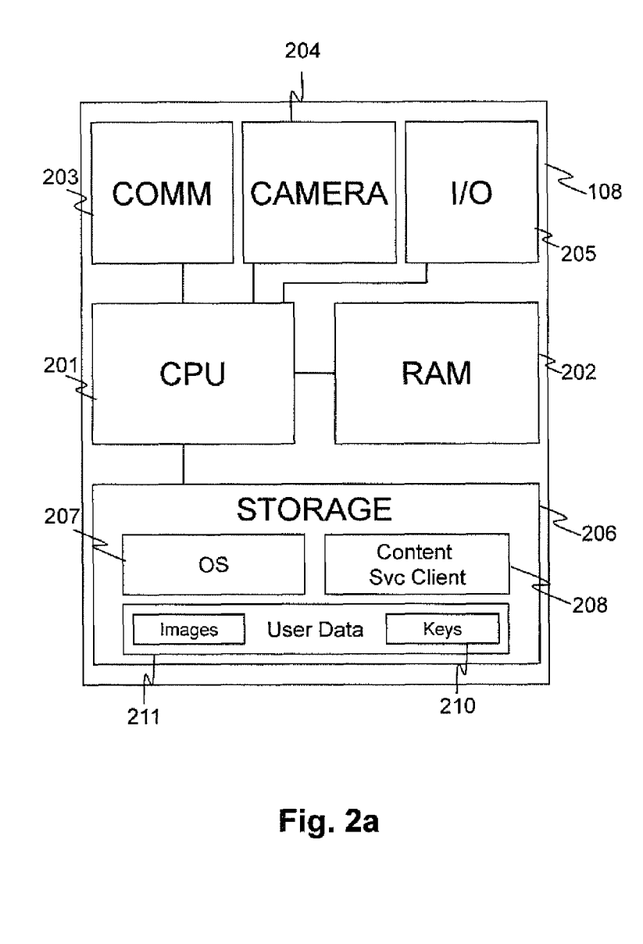
FIG. 2a depicts a diagram of an exemplary mobile device according to an embodiment of the present disclosure.

The functional components of the mobile terminal 108 are depicted in more detail in FIG. 2a. The terminal comprises a Central Processing Unit 201 which executes computer executable instructions of various software programs and has access to Random Access Memory 202 of the terminal. The terminal also has communication means 203, e.g. means to access 3G and/or Wireless radio networks, a camera 204 which is capable of producing still images and/or video streams, and I/O devices such as a display and a keyboard. In an embodiment, at least part of the keyboard may be integrated into a touch screen display. Finally, the device has a persistent memory storage 206 for storing both software, e.g. operating system 207 and user downloadable software, e.g. a client software 208, implementable e.g. using Java™, for using the content management service of an embodiment of the present disclosure. The storage device is also capable of storing user data 211, e.g. still images and/or videos shot by the user of the terminal using the camera 204 and symmetric encryption keys generated for encrypting the images/videos.

Figure 2B:
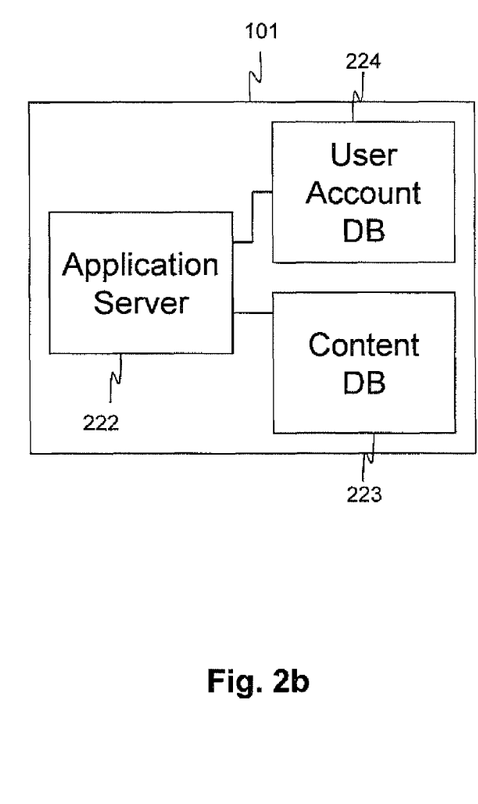
FIG. 2b depicts a diagram of an exemplary server according to an embodiment of the present disclosure.

FIG. 2b shows some functional components of the server 101 of an arrangement of an embodiment of the present disclosure. The server comprises an application server 222, which provides application services e.g. relating to the user accounts 224 and content 223 of the content management service. The content received from terminals is stored in the content database 223 and data relating to users and their activities is stored in the user account database 224. In an embodiment, the user account database 224 contains symmetric encryption keys of digital content received from the terminal device 108. The services may comprise e.g. a service for receiving encrypted content data and encrypted symmetric encryption keys from the terminal device 108 and a service for sending data and instructions for managing the digital content data items stored in the memory of the terminal device 108.

Figure 3A:
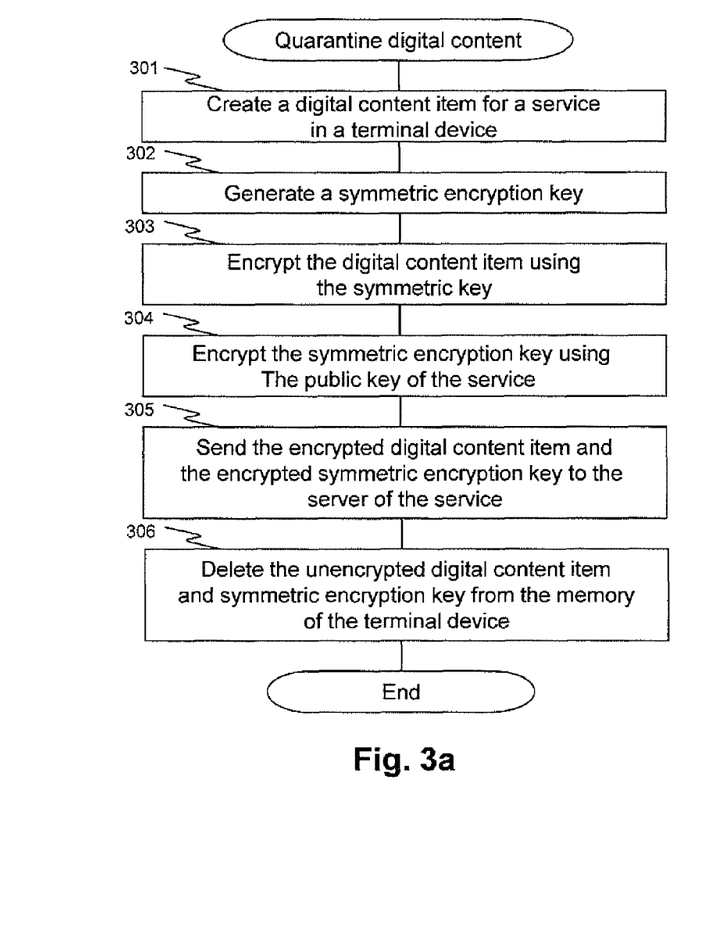
FIG. 3a shows an exemplary method of quarantining digital content according to an embodiment of the present disclosure.

FIG. 3a shows an exemplary method of quarantining digital content data in a terminal device and sending the data securely to a server computer according to an embodiment of the present disclosure. As the first step 301, a digital content data item, e.g. a digital still picture or a video stream is created in the terminal device (or imported to the device from another device). Then, in step 302, a symmetric encryption key is generated for the purpose of encrypting the created content data item. The encryption of the content is then performed 303. Furthermore, the symmetric encryption key used for the encryption of the content, is also encrypted 304 using the public encryption key of the service to which the content data item is about to be sent. Both the encrypted content data item and the encrypted symmetric encryption key are then sent 305 to a server computer. Finally, in step 306, the original, unencrypted versions of the digital content data item and the symmetric encryption key are deleted from the memory and/or storage means of the terminal device.

Now the content has been quarantined in the local device. It has also been sent securely to the service for further action, e.g. for the sale of the content. The content data item still exists in the local device but only in encrypted format and there is no key in the device that is able to decrypt the content data item. If the service which received the content is able to transfer the rights of the content further, the server instructs the terminal device to delete the encrypted content data item. If, on the other hand, the service is unable to transfer the rights of the content further, the rights are returned back to the terminal by sending an unencrypted version of the symmetric encryption key back to the terminal.

Figure 3B:
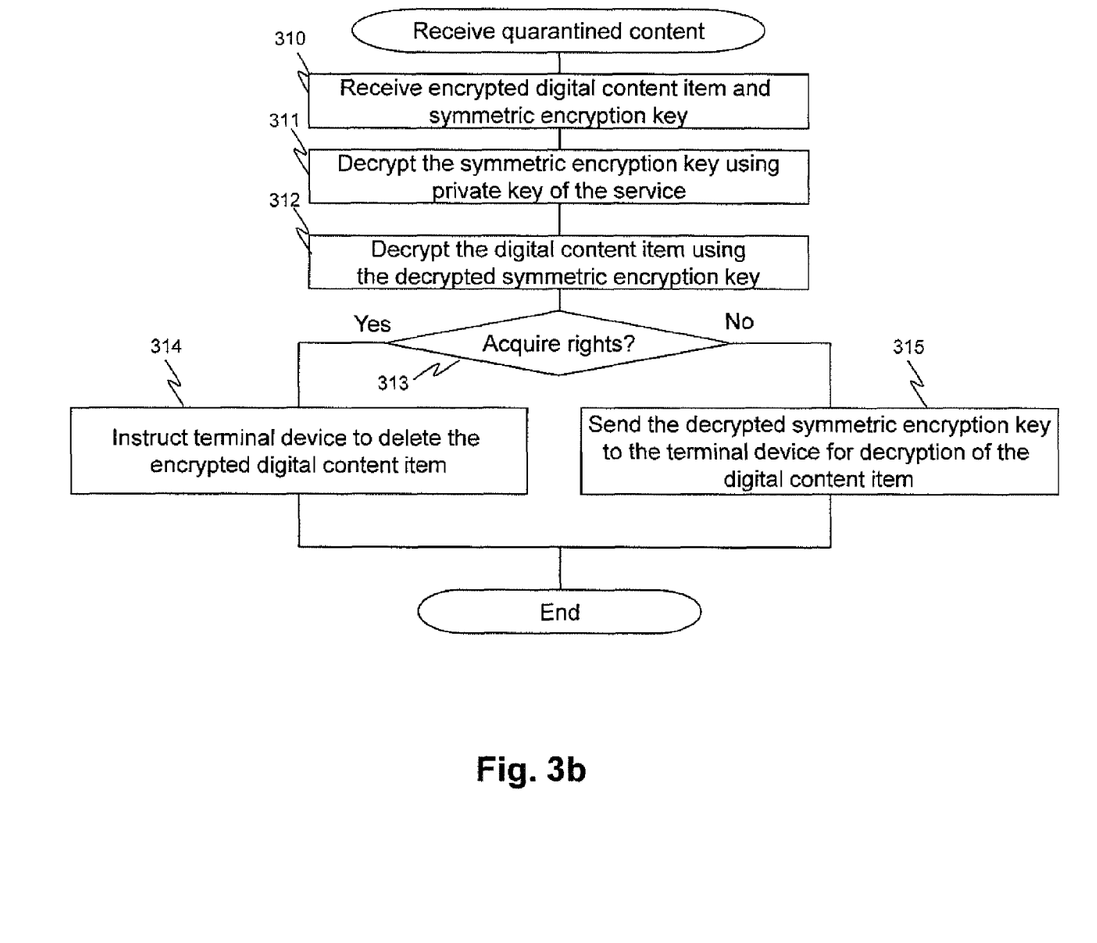
FIG. 3b shows an exemplary method of receiving quarantined digital content according to an embodiment of the present disclosure.

FIG. 3b depicts an example of a method executable in a server computer according to an embodiment of the present disclosure. In step 310, the server (101 in FIG. 1) receives an encrypted digital content item along with an encrypted symmetric encrypted key from a terminal device (108 in FIG. 1). The server then decrypts 311 the symmetric encryption key using private key of a public/private key pair whose public key was used for encrypting the symmetric key. Next, the server decrypts 312 the digital content data item using the decrypted symmetric encryption key. The unencrypted digital content data item may now be put up for sale or its rights may be attempted to be transferred to another party by some other means 313. If the rights are acquired by a party, then the server 101 instructs the terminal device to delete the encrypted digital content item as the user of the device no more has rights to the digital content. If the rights transfer is not successful, the server sends an unencrypted version of the symmetric encryption key to the terminal device for decryption of the digital content item.

To a person skilled in the art, the foregoing exemplary embodiments illustrate the model presented in this application whereby it is possible to design different methods, arrangements and computer program products, which in obvious ways to the expert, utilize the inventive idea presented in this application.

The invention claimed is:

1. A method for quarantining digital content data for a service in a terminal device, the method comprising:
creating a digital content data item using a camera of the terminal device, in a memory of the terminal device, wherein the digital content data item comprises at least one of the following: a digital still image and a video stream,
generating a symmetric encryption key for encrypting the created digital content data item,
encrypting the digital content data item using the generated symmetric encryption key,
encrypting the generated symmetric encryption key using a public key of the service,
deleting the unencrypted version of the digital content data item and of the symmetric encryption key from the memory of the terminal device,
sending the encrypted version of the digital content data item and of the symmetric encryption key to a server of a service for sale of the digital content data item, and
receiving from the server of the service at least one of the following:
an instruction to delete the encrypted digital content data item from the memory of the terminal device in response to the server of the service being able to transfer rights of the digital content data item, and
a decrypted version of the symmetric encryption key for decrypting the encrypted digital content data item in the memory of the terminal device in response to the server of the service being unable to transfer rights of the digital content data item further.

2. A method of claim 1, further comprising:
generating the symmetric encryption key used by at least one of the following algorithms: Twofish, Serpent, AES, Blowfish, CAST5, RC4, 3DES and IDEA.

3. A method of claim 1, further comprising:
encrypting the digital content data item using at least one of the following algorithms: Twofish, Serpent, AES, Blowfish, CAST5, RC4, 3DES and IDEA.

4. A method of claim 1, wherein the public key is at least one of the following: RSA, DSS, ElGamal and Paillier.

5. A method of claim 1, further comprising:
deleting the unencrypted version of the digital content data item and of the symmetric encryption key from the memory of the terminal device in response to encrypting the digital content data item and the generated symmetric encryption key.

6. A method for managing in a server computer of a service, a quarantined digital content data item produced using a camera in a terminal device, wherein the digital content data item comprises at least one of the following: a digital still image and a video stream, the method comprising:
receiving an encrypted digital content data item from the terminal device,
wherein an unencrypted version of the digital content data item and of the symmetric encryption key is deleted from a memory of the terminal device,
receiving an encrypted symmetric encryption key from the terminal device for sale of the digital content data item,
decrypting the encrypted symmetric encryption key using a private key of the service,
decrypting the digital content data item using the decrypted symmetric encryption key, and
sending to the terminal device at least one of the following:
an instruction to delete the encrypted digital content from the memory of the terminal device in response to the server of the service being able to transfer rights of the digital content data item further, and
a decrypted version of the symmetric encryption key for decrypting the encrypted digital content data item in the memory of the terminal device in response to the server of the service being unable to transfer rights of the digital content data item further.

7. A mobile terminal device comprising a camera, a processor and a memory and being communicatively connectable to a server computer over a wireless data communication network, the mobile terminal device configured to:
  create a digital content data item using camera of the terminal device in the memory of the terminal device, wherein the digital content data item comprises at east one of the following: a digital still image and a video stream,
  generate a symmetric encryption key for encrypting the created digital content data item,
  encrypt the digital content data item using the generated symmetric encryption key,
  encrypt the generated symmetric encryption key using a public key of a service,
  delete an unencrypted version of the digital content data item and of the generated symmetric encryption key from the memory of the terminal device,
  send the encrypted version of the digital content data item and of the generated symmetric encryption key to a server of the service for sale of the digital content data item, and
  receive from the server of the service at least one of the following:
    an instruction to delete the encrypted digital content data item from the memory of the terminal device in response to the server of the service being able to transfer rights of the digital content data item further, and
    a decrypted version of the symmetric encryption key for decrypting the encrypted digital content data item in the memory of the terminal device in response to the server of the service being unable to transfer rights of the digital content data item further.

8. A mobile terminal device of claim 7, further configured to:
  delete the unencrypted version of the digital content data item and of the symmetric encryption key from the memory of the terminal device in response to encrypting the digital content data item and the generated symmetric encryption key.

9. A system comprising the mobile terminal device of claim 7 communicatively connected to a server computer comprising a processor and a memory and being communicatively connectable to the mobile terminal device over a data communication network, the server computer configured to:
  receive an encrypted digital content data item from the mobile terminal device for sale of the digital content data item produced using a camera of the terminal device, wherein the digital content data item comprises at least one of the following: a digital still image and a video stream,
  receive an encrypted symmetric encryption key from the mobile terminal device,
  decrypt the encrypted symmetric encryption key using a private key of the service,
  decrypt the digital content data item using the decrypted symmetric encryption key, and
  send to the mobile terminal device at least one of the following:
    an instruction to delete the encrypted digital content from the memory of the mobile terminal device in response to the server of the service being able to transfer rights of the digital content data item further, and
    a decrypted version of the encrypted symmetric encryption key for decrypting the encrypted digital content data item in the memory of the mobile terminal device in response to the server of the service being unable to transfer rights of the digital content data item further.

10. A server computer comprising a processor and a memory and being communicatively connectable to a terminal device over a data communication network, the server computer configured to:
  receive an encrypted digital content data item from a terminal device for sale of a digital content data item produced using camera of the terminal device, wherein the digital content data item comprises at least one of the following: a digital still image and a video stream,
  receive an encrypted symmetric encryption key from the terminal device,
  decrypt the symmetric encryption key using a private key of the service,
  decrypt the digital content data item using the decrypted symmetric encryption key, and
  send to the terminal device at least one of the following:
    an instruction to delete the encrypted digital content from the memory of the terminal device in response to the server of the service being able to transfer rights of the digital content data item further, and
    a decrypted version of the encrypted symmetric encryption key for decrypting the encrypted digital content data item in the memory of the terminal device in response to the server of the service being unable to transfer rights of the digital content data item further.

11. A non-transitory computer readable medium comprising computer executable program code, which when executed by at least one processor of a mobile terminal device, causes the mobile terminal device to:
  create a digital content data item in a memory of the terminal device using a camera of the terminal device, wherein the digital content data item comprises at least one of the following: a digital still image and a video stream,
  generate a symmetric encryption key for encrypting the created digital content data item,
  encrypt the digital content data item using the generated symmetric encryption,
  encrypt the generated symmetric encryption key using a public key of the service,
  delete an unencrypted version of the digital content data item and of the generated symmetric encryption key from the memory of the terminal device,
  send the encrypted version of the digital content data item and of the generated symmetric encryption key to a server of the service for sale of the digital content data item, and
  receive from the server of the service at least one of the following:
    an instruction to delete the encrypted digital content data item from the memory of the terminal device in response to the server of the service being able to transfer rights of the digital content data item further, and
    a decrypted version of the symmetric encryption key for decrypting the encrypted digital content data item in the memory of the terminal device in response to the server of the service being unable to transfer rights of the digital content data further.

12. The non-transitory computer readable medium of claim 11, wherein the computer executable program code, when executed by the at least one processor, causes the mobile terminal device to:

delete the unencrypted version of the digital content data item and of the generated symmetric encryption key from the memory of the terminal device in response to encrypting the digital content data item and the generated symmetric encryption key.

13. A non-transitory computer readable medium comprising computer executable program code, which when executed by at least one processor of a server computer, causes the server computer to:

receive an encrypted digital content data item from a terminal device for sale of the digital content data item produced using a camera of the terminal device, wherein the digital content data item comprises at least one of the following: a digital still image and a video stream, wherein an unencrypted version of the digital content data item and of the symmetric encryption key is deleted from a memory of the terminal device, receive an encrypted symmetric encryption key from the terminal device, decrypt the encrypted symmetric encryption key using a private key of the service, decrypt the digital content data item using the decrypted symmetric encryption key, and send to the terminal device at least one of the following:

an instruction to delete the encrypted digital content from the memory of the terminal device in response to the server of the service being able to transfer rights of the digital content data item further, and a decrypted version of the symmetric encryption key for decrypting the encrypted digital content data item in the memory of the terminal device in response to the server of the service being unable to transfer rights of the digital content data item further.

* * * * *